(12) United States Patent
Buer

(10) Patent No.: US 6,260,132 B1
(45) Date of Patent: Jul. 10, 2001

(54) METHOD AND APPARATUS FOR SECURE ADDRESS RE-MAPPING

(75) Inventor: Mark Leonard Buer, Gilbert, AZ (US)

(73) Assignee: VLSI Technology, Inc., San Jose, CA (US)

( * ) Notice: Subject to any disclaimer, the term of this patent is extended or adjusted under 35 U.S.C. 154(b) by 0 days.

(21) Appl. No.: 09/241,263

(22) Filed: Feb. 1, 1999

(51) Int. Cl.[7] ................................................. G06F 13/00
(52) U.S. Cl. .............................. 712/208; 710/4; 710/200; 365/185.17
(58) Field of Search ................................ 710/4–7, 200; 711/200; 712/208–213, 220; 365/185.05–185.17

(56) References Cited

U.S. PATENT DOCUMENTS

| | | | |
|---|---|---|---|
| 5,377,357 | * 12/1994 | Nishigaki et al. | 710/101 |
| 5,581,567 | * 12/1996 | Chen et al. | 714/758 |
| 5,617,559 | 4/1997 | Le et al. | 711/169 |
| 5,654,923 | * 8/1997 | Mizobata et al. | 365/189.01 |
| 5,657,291 | * 8/1997 | Podlesny et al. | 365/230.05 |
| 5,706,407 | 1/1998 | Nakamura et al. | 700/251 |
| 5,963,104 | * 10/1999 | Buer | 331/78 |
| 5,964,825 | * 10/1999 | Seshan et al. | 708/490 |

FOREIGN PATENT DOCUMENTS

0608060A1   7/1994  (EP) .

* cited by examiner

Primary Examiner—Christopher B. Shin
(74) Attorney, Agent, or Firm—Douglas L. Weller

(57) ABSTRACT

An address decoder includes a plurality of address decoder modules. Each address decoder module has a select line for each of a plurality of devices. Each of a plurality of XOR combination circuits performs a logic XOR function of all select lines for a single device from the plurality of devices. State control within the address decoder activates one address decoder module at a time.

10 Claims, 4 Drawing Sheets

METHOD AND APPARATUS FOR SECURE ADDRESS RE-MAPPING

BACKGROUND

The present invention concerns security with a computing system, and pertains particularly to secure address remapping.

Address decoders are often utilized for memory mapping within a computing system. For example, in systems which utilize the Advanced Microcontroller Bus Architecture (AMBA), an address decoder has the main function of centrally decoding the address provided by a master and selecting the appropriate bus slave. For more information on AMBA and the AMBA System Bus (ASB), see the web site for Advanced Risk Machines, Ltd., at WWW.ARM.com.

While integrated circuits often include secure features for the purpose of protecting against theft or misuse, there typically has been no secure features built into address decoders.

SUMMARY OF THE INVENTION

In accordance with the preferred embodiment of the present invention an address decoder includes a plurality of address decoder modules. Each address decoder module has a select line for each of a plurality of devices. Each of a plurality of XOR combination circuits performs a logic XOR function of all select lines for a single device from the plurality of devices. State control within the address decoder activates one address decoder module at a time.

In the preferred embodiment, each address decoder module is connected to an address bus portion of an AMBA System Bus (ASB). For example, when the address decoder is implemented for an AMBA System Bus (ASB), each address decoder module can be implemented as a standard ASB address decoder.

In the preferred embodiment, the state control asserts reset signals of all address decoder modules that are not activated. The permission access level required to access a device and the base address used to access a device can vary dependent on which address decoder module is activated. For example, different boot addresses for a processor could be accessed such that initially software could be booted (location 0) from flash memory and then copied to random access memory (RAM) to be executed such that RAM now utilizes boot address (location 0).

The present invention allows for the addition of security features into an address decoder. The use of multiple address decoder modules, as set out in the present invention, allows the re-use of a standard block to form a secure address decoder. Thus, in addition to an increase in security, the present invention allows for a simpler design when an address decoder needs to take into account state changes.

DESCRIPTION OF THE PREFERRED EMBODIMENT

Figure 1:
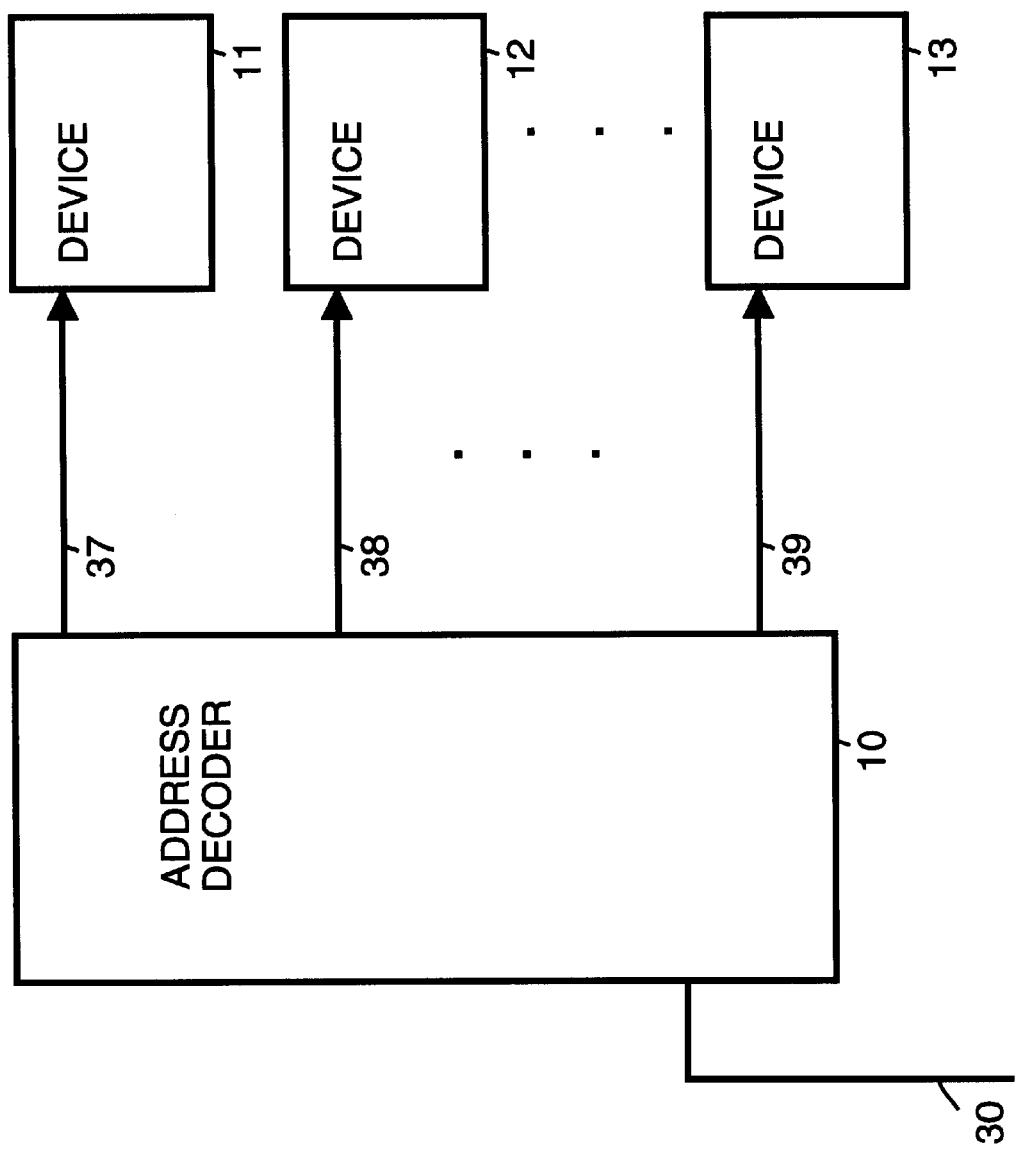
FIG. 1 is a simplified block diagram that shows a modular address decoder used to decode addresses on a bus in order to select a device in accordance with a preferred embodiment of the present invention.

FIG. 1 is a simplified block diagram that shows a modular address decoder 10 used to decode addresses on a bus 30 in order to select one of a plurality of devices represented by a device 11, a device 12 and a device 13. While three devices are shown by way of example, any number of devices may be used.

When an address on bus 30 indicates device 11 is to be selected, address decoder 10 will assert the signal on a device select line 37. When an address on bus 30 indicates device 12 is to be selected, address decoder 10 will assert the signal on a device select line 38. When an address on bus 30 indicates device 13 is to be selected, address decoder 10 will assert the signal on a device select line 39.

Bus 30, for example, operates in accordance with the Advanced Microcontroller Bus Architecture (AMBA).

Figure 2:
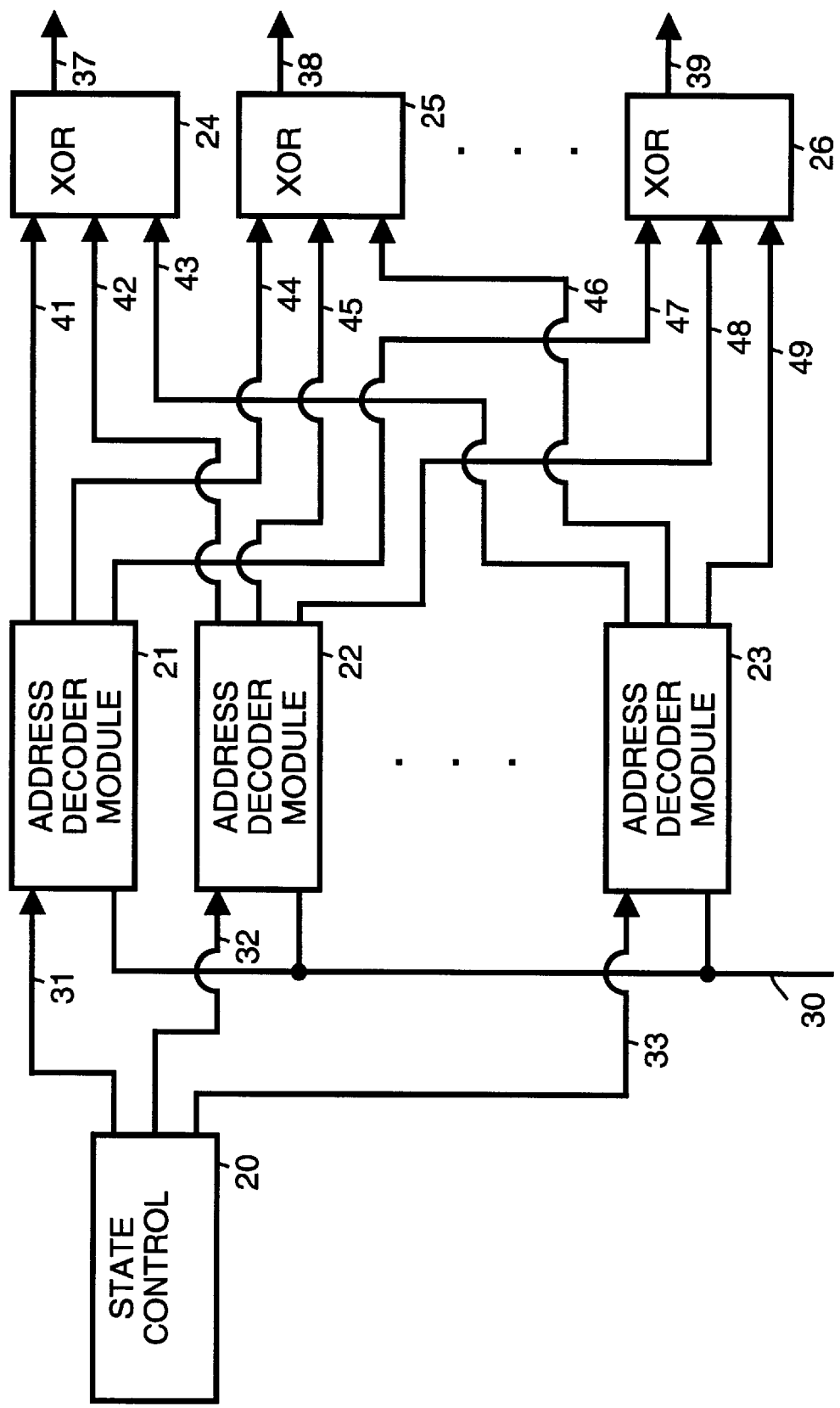
FIG. 2 is a simplified block diagram of the modular address decoder with secure features shown in FIG. 1 in accordance with a preferred embodiment of the present invention.

FIG. 2 is a block diagram of address decoder 10. Address decoder 10 includes a plurality of address decoder modules. The address decoder modules are represented by an address decoder module 21, an address decoder module 22 and an address decoder module 23. While three address decoder modules are shown by way of example, it is only required for the present invention that at least two address decoder modules are present. Any number greater than two is acceptable.

Each address decoder module has a unique device select line for each device. For example, address decoder module 21 has a device select line 41 for a first device, a device select line 44 for a second device and a device select line 47 for a third device. Address decoder module 22 has a device select line 42 for a first device, a device select line 45 for a second device and a device select line 48 for a third device. Address decoder module 23 has a device select line 43 for a first device, a device select line 46 for a second device and a device select line 49 for a third device.

A state control block 20 is used to select only one of the address decoder modules at a time. State control block 20 will assert the reset signals of the address decoder modules that are not selected.

For example, when address decoder module 21 is not selected, state control block 20 will use a reset line 31 to assert a reset signal to address decoder module 21. When address decoder module 22 is not selected, state control block 20 will use a reset line 32 to assert a reset signal to address decoder module 22. When address decoder module 23 is not selected, state control block 20 will use a reset line 33 to assert a reset signal to address decoder module 23.

Logic XOR circuitry 24 is used to select an active select signal for the first device to be forwarded to device select line 37. XOR circuitry 24 guarantees that one and only one device select line from device select lines 41, 42 and 43 are asserted before an active select signal for the first device is forwarded to device select line 37. If more than one device select line from device select lines 41, 42 and 43 are asserted at the same time, this indicates that more than one address decoder modules are simultaneously active; therefore, XOR circuitry 24 will not assert select line 37 and a bus error will result.

Logic XOR circuitry 25 is used to select an active select signal for the first device to be forwarded to device select line 38. XOR circuitry 25 guarantees that one and only one device select line from device select lines 44, 45 and 46 are asserted before an active select signal for the first device is forwarded to device select line 38. If more than one device select line from device select lines 44, 45 and 46 are asserted at the same time, this indicates that more than one address decoder modules are simultaneously active; therefore, XOR circuitry 25 will not assert select line 38 and a bus error will result.

Logic XOR circuitry 26 is used to select an active select signal for the first device to be forwarded to device select line 39. XOR circuitry 26 guarantees that one and only one device select line from device select lines 47, 48 and 49 are asserted before an active select signal for the first device is forwarded to device select line 39. If more than one device select line from device select lines 47, 48 and 49 are asserted at the same time, this indicates that more than one address decoder modules are simultaneously active; therefore, XOR circuitry 26 will not assert select line 39 and a bus error will result.

The address decoder modules can each have unique permissions and base addresses for each of the devices. State control block 20 detects state changes, for example, by monitoring a value within a register, or by logic detecting a state change within a processor. For example, a state change may be from a normal state to a secure state, or from a normal state to a test state.

The use of multiple address decoder modules allows the re-use of a standard block to form a secure address decoder. This increases security, allows for a simpler design when an address decoder needs to take into account state changes.

Figure 3:
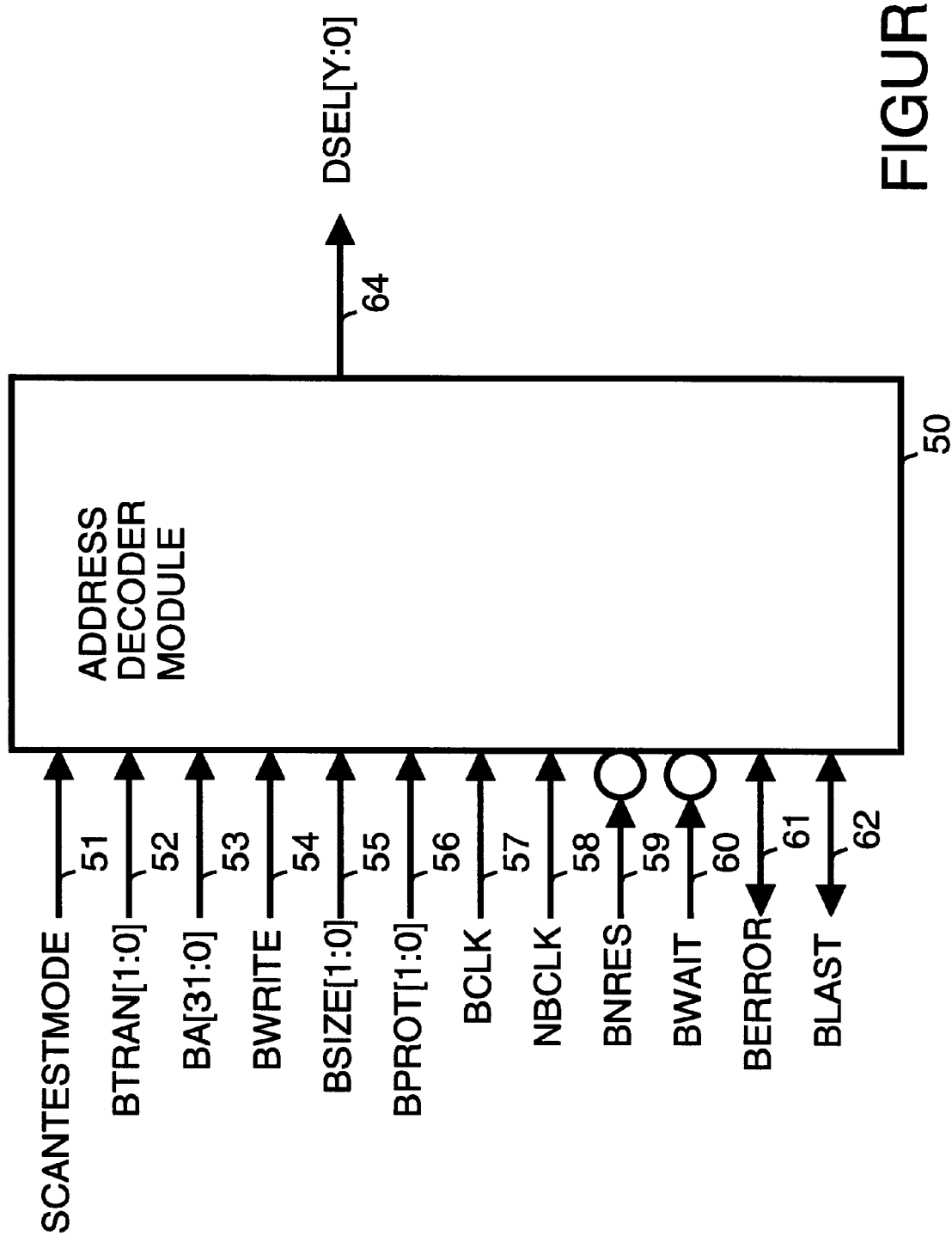
FIG. 3 shows simplified input/output (I/O) for an address decoder module in accordance with a preferred embodiment of the present invention.

FIG. 3 shows simplified input/output (I/O) for an address decoder module 50 which is representative of the address decoder modules shown in FIG. 2. Address decoder module 50 is designed to work with an AMBA System Bus (ASB). Address decoder module 50 provides centralized address decoding for two or more ASB slave peripherals. Address decoder module 50 provides a default transfer response and can be configured for both high and low speed operation. Address decoder module 50 can be configured to also serve as a protection unit. This is accomplished by allowing an address region to be read/write, read only, or write only, by allowing an address region to be accessed in supervisor mode only, by allowing an address region to be opcode only or data only, by reporting incorrectly aligned memory accesses, by allowing or disallowing byte, halfword, and word accesses, and by reporting accesses to undefined memory regions.

A scan test mode (ScanTestMode) input pin 51, when asserted high puts address decoder module 50 into the test state. In the test state, the transfer response tristates of address decoder module 50 are disabled and slave select (dsel) output pins 64 will always select one and only one slave. Also when in the test state, a decoder enable (DecEnable) latch within address decoder module 50 is always transparent, and internal test points are enabled.

Two-bit transfer type (btran[1:0]) input bus pins 52 receive input which indicates the transfer type of the next bus transaction. The three types of bus transaction are address-only (ATRAN, btran=00), sequential (STRAN, btran=11), and non-sequential (NTRAN, btran=10).

Thirty-two bit address (ba[31:0]) input bus pins 53 receive the AMBA system bus address.

A transfer direction (bwrite) input pin 54 receives an indication of the transfer direction. When bwrite is low, this indicates a read cycle. When bwrite is high this indicates a write cycle.

Two-bit transfer size (bsize[1:0]) input bus pins 55 indicate the size of the data word to be transmitted. The three possible sizes are 32-bits (bsize=00), 16-bits (bsize=01), and 8-bits (bsize=10).

Two-bit protection control (bprot[1:0]) input bus pins 56 provides information about the transfer type to implement basic transfer protection. Information includes whether the data is an opcode or data, and whether the access mode is user or supervisor.

A bus clock (bclk) input pin 57 receives the system bus clock.

A not bus clock (nbclk) input pin 58 receives the inverted system bus clock.

A reset (bnres) input pin 59 receives a reset signal which, when low, resets both address decoder module 50.

A wait response (bwait) bi-directional pin 60 carries a signal which, when high indicates that at least one additional cycle is needed to complete the bus transaction, and when low indicates the transaction should complete in the current cycle.

An error response (berror) b-idirectional pin 61 carries a signal which, when high indicates a transfer error has occurred, and when low indicates the transfer is proceeding correctly. Error response (berror) bi-directional pin 61 is also used with last response (blast) bi-directional pin 62 to indicate a bus retraction.

A last response (blast) bi-directional pin 62 carries a signal which when high indicates that another cycle is needed for address decoding, and when low indicates that a burst sequence may continue. Last response (blast) bi-directional pin 62 is also used with error response (berror) bi-directional pin 61 to indicate a bus retraction.

Slave select (dsel[y:0]) output bus pins 64 generates signals for a bus consisting of enables for each slave device. Exactly one or none of the slaves is selected at a given time. When a single pin (dsel[x]) of slave select (dsel [y:0]) output bus pins 64 is high, this indicates that slave x is selected. When a single pin (dsel[x]) of slave select (dsel[y:0]) output bus pins 64 is low, this indicates that slave x is not selected.

Figure 4:
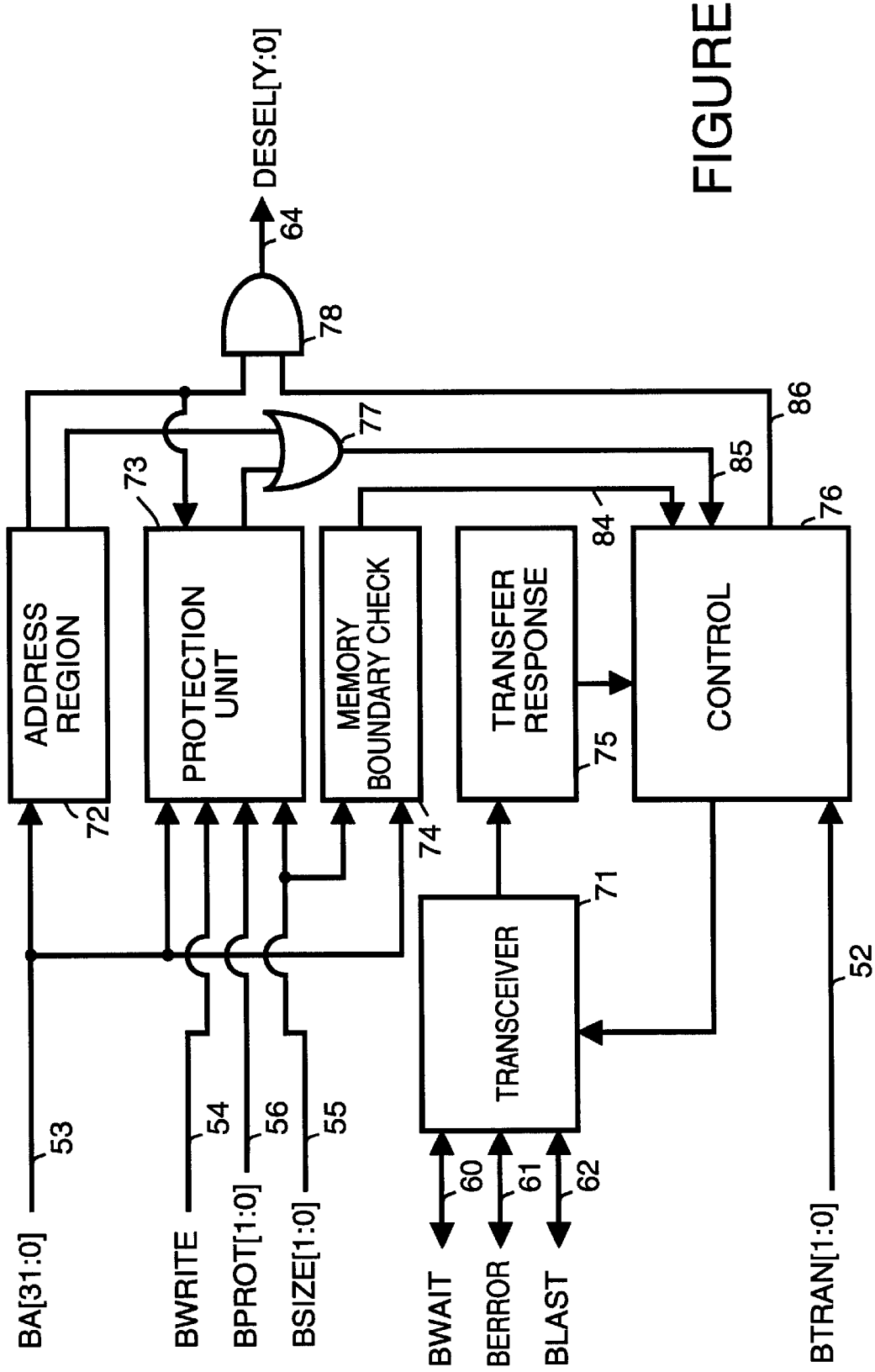
FIG. 4 is a simplified block diagram of an address decoder module in accordance with a preferred embodiment of the present invention.

FIG. 4 is a simplified block diagram of address decoder module 50. An address region 72, a memory transfer response block 75, a transceiver 71, a set of logical AND gates 78 and a control block 76 provide address decoding functionality for address decoder module 50. The address decoding functionality centrally decodes an address and selects an appropriate slave device.

If the address range is a single address or is size $2^n$ and starts on a multiple of $2^n$, then the address decode consists simply of an upper order bit tag compare. If the address region is not a power of 2, then identical upper order bits are tag compared. The non-matching lower order bits are then compared, except for address ranges starting with 0 or ending in 0xFFFFFFFF, using two comparators. For the degenerate region starting at zero, the range 0 to A is determined by just a <A. Likewise, the region A to 0xFFFFFFFF is determined by just a >A.

Address region 72 detects an error and asserts, through a logic OR gate 77, an error input 85 to control 76 when a user accesses an address region that contains no slave, an error response is produced.

A memory boundary check block 74 is included so that while address decoder module 50 is decoding the address, it also determines if a sequential access will still be in the active address region. To do this, memory boundary check block 74 checks the current address against the upper bounds for all address regions. The low order address bit (A[0]) of the address (ba[31:0]) input bus is ignored for word and half-word transfers. The second lowest order address bit (A[1]) of address (ba[31:0]) input bus is ignored for word transfers. If the current address matches one of the upper bounds, then a DecLast signal on a line 84 is asserted and address decoder module 50 inserts a wait state.

In addition to the error detection provided by address region 72, the address decoder module 50 provides additional access protection. This additional protection is provided by a protection unit 73. Protection unit 73 generates an error signal which is forwarded through logic OR gate 77 to error input 85 of control block 76.

Protection unit 73 detects an access alignment violation if the user accesses a data word at an address with a suffix other than 00, or accesses a halfword at an address with a suffix other than 0. In this case protection unit 73 generates an error signal. Detection of this type of violation can be disabled.

Protection unit 73 detects a read/write violation when an attempt is made to read from a write only region or to write to a read only region will produce an error response. In this case protection unit 73 generates an error signal.

Protection unit 73 detects a supervisor region access error when a user accesses a region marked for supervisor access only. In this case protection unit 73 generates an error signal.

Protection unit 73 detects an incorrect transfer size error if the user accesses an address with an unsupported transfer size (Byte, Halfword, or Word). In this case protection unit 73 generates an error signal.

Protection unit 73 detects a data type error when opcode fetch to a region marked as data only is attempted or a data access to a region marked as opcode only is attempted. In either case protection unit 73 generates an error signal.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. An address decoder comprising:
    a plurality of address decoder modules, each address decoder module from the plurality of address decoder modules having a select line for each of a plurality of devices;
    a plurality of XOR combination circuits, each XOR combination circuit from the plurality of XOR combination circuits performing a logic XOR function of all select lines for a single device from the plurality of devices; and,
    state control means for activating one address decoder module from the plurality of address decoder modules at a time.

2. An address decoder as in claim 1, wherein each address decoder module from the plurality of address decoder modules is connected to an address bus.

3. A method as in claim 1, wherein the state control means asserts reset signals of all address decoder modules, from the plurality of address decoder modules, which are not activated.

4. A method as in claim 1 wherein a permission access level required to access a device varies dependent on which address decoder module is activated.

5. A method as in claim 1 wherein a base address used to access a device varies dependent on which address decoder module is activated.

6. A method for decoding addresses comprising the following steps:
    (a) activating one address decoder module from a plurality of address decoder modules at a time, each address decoder module from the plurality of address decoder modules having one select line for each device in a plurality of devices;
    (b) activating, by the address decoder module from the plurality of address decoder modules, a first select line for a first device from the plurality of devices; and,
    (c) performing, for each device in the plurality of devices, a logic XOR function of all select lines for the device.

7. A method as in claim 6, wherein in step (a) each address decoder module from the plurality of address decoder modules is connected to an address bus.

8. A method as in claim 6, wherein step (a) includes the following substep:
    (a.1) asserting, by state control logic, reset signals of all address decoder modules, from the plurality of address decoder modules, which are not activated.

9. A method as in claim 6 wherein a permission access level required to access a device varies dependent on which address decoder module is activated.

10. A method as in claim 6 wherein a base address used to access a device varies dependent on which address decoder module is activated.

* * * * *